UNITED STATES PATENT OFFICE.

HERMANN PAPE, OF HAMBURG, GERMANY.

METHOD OF OBTAINING OXID FUMES FROM ORES AND FURNACE PRODUCTS.

No. 877,114.　　　Specification of Letters Patent.　　　Patented Jan. 21, 1908.

Application filed December 31, 1906. Serial No. 350,312.

*To all whom it may concern:*

Be it known that I, HERMANN PAPE, a subject of the German Emperor, and residing at Hohe Bleichen 36, Hamburg, Germany, have invented a certain new and useful Improved Method of Obtaining Oxid Fumes from Ores and Furnace Products, of which the following is a specification.

The present invention relates to a method of obtaining oxid fumes from ores or furnace-products.

It is known that metals which, in their reduction by carbon from volatile oxid in the presence of oxygen, or which volatilize as metallic vapor and then burn again to oxids in the current of air, may be separated from ores or furnace products by mixing the latter with carbon, and conducting a stream of flames or current of air through the mixture which brings the carbon to incandescence, so that the temperature of reduction of the metal contained in the ores is attained, said stream of flames or current of air simultaneously containing excess oxygen, so that the oxidation of the reduced metal may be effected. In this manner zinc and lead, among other metals, may be separated from their oxygen compounds, or from their carbonic acid or sulfur compounds. In the case of zinc, for example, the arrangement has been such that a mixture of ore with carbon has been placed on a long flat grate, air having been passed through the charge by means of a blast. The charge became incandescent very soon, and zinc oxid vapors were developed which were led away with the furnace gases and were collected in sack-filters after they had cooled down. The furnaces referred to work periodically, being charged afresh from time to time, a blast being sent through the charge until the removal of the zinc is completed. The temperature is maintained so high that as granular a mass as possible and one which is as little sintered together as possible is left behind as a residue, which mass is withdrawn from the furnace after the charge is worked up. This method may be employed for certain ores particularly for American franklinite; but if the ore sinters, however, or shows a tendency to melt, the above described method of working cannot be employed, as much too great quantities of zinc are then left behind in the residue.

In contradistinction to the above described method, the method according to the present invention is such that every kind of zinc ore for example, or zinkiferous furnace-products may be worked up with success, and also in a continuous process. Forms of furnaces may be employed such as those which have already been used for similar purposes. The ore which is prepared in the manner as further described hereafter is introduced at an admission place into the furnaces, while the liquid dross which is formed may be continuously removed at suitable places from the lower parts of the furnace.

The new method in accordance with the present invention is a combination of various operations which in part have become known in some details, which operations are connected in such a manner that a combined effect which has hitherto not been attained is produced. The yield according to the present method is such a favorable one that zinkiferous materials, for example may have the zinc removed from them up to 3% and less.

The quantity of carbon which is added in accordance with the method of the present invention is sufficient so that the heat produced in the combustion to carbon monoxid or carbon dioxid will suffice not only for the reduction and vaporization of the metal, but also for melting the slag or dross which forms.

The disintegration of the ore or of the furnace-products is sufficiently fine and they are sufficiently intimately mixed with carbon in order to effect the separation of the separate grains of ore from one another with certainty by means of grains of carbon situated between them. It is true that in certain cases a fine disintegration and an intimate mixing of the materials has been found preferable hitherto for charging the muffles of furnaces for zinc distillation, but for furnaces, however, in which the reduction of zinc is effected by employing a current of air which is sent through the charge, the fine disintegration of the ore with intimate mixing of the reducing means which is likewise finely disintegrated has not yet been employed.

According to the method of the present invention the material is chosen of such a granular size that at least 50% of the materials are less than ¾ mm. in diameter. Such grains are mixed with carbon in such a manner that it may be taken that on an average every particle of ore is separated from its neighbor by at least one particle of carbon. The result is, that each particle of ore certainly exposes one surface to the incandescent carbon in the process of reduction.

After the raw material has been mixed with the carbon or similar means of reduction, any possibly necessary additions, such as lime, sand or the like which are likewise suitably disintegrated are added to the mixture, and lastly an agglutinant is added, if the mixture in itself is not, say, in a condition to become sufficiently hard after it has been pressed together. As agglutinant, lime, cement, disintegrated coal-tar pitch, etc for example, may be taken, the latter, say, in the condition in which it is employed in making briquets from small coal.

After the charge has been ground and mixed in the above described manner, the same is molded into briquets by means of a press in known manner. Also the charge may be placed in a suitable sintering furnace in the condition which is desired for the working of the furnace. The prepared charge is then further worked up in a furnace which is continuously charged from above. A powerful current of air is passed through the charge, it may be by means of a blast, it may be by suction, and is regulated in such a manner that the charge is heated to at least a red glow up to its upper surface. The formation of tutty in the charge itself is thereby avoided. The briquets which are newly thrown on to the charge catch fire and glow on the upper surface, and the metallic vapors which rise up from the lower part of the charge burn to oxids at the upper surface of the charge. Air is preferably admitted in the melting zone in which there must be incandescence when working up zinc ores, and a quantity of coke in pieces or lumps is added to the charge, so that the necessary temperature is certainly maintained in the melting zone. When the briquets arrive in the melting zone in an already semi-plastic state, the zinc compounds which are in the briquets in direct contact with carbon are decomposed, and the zinc vapors which form burn to zinc oxid again above the melting zone. At the high final temperature which characterizes the new process, a simple sintering together of the grains of ore from which the zinc is removed is prevented from taking place, and the same always become molten. By the separate melted grains flowing together, dross is finally formed which is blown out from the lower part of the furnace in the usual manner.

The heat of the gases of combustion which carry away the volatile metallic oxids which are formed in the furnace may be employed in suitable manner, for example for drying ores, or for heating steam boilers.

Metals which are reduced by carbon, but which are not volatilized with an excess of oxygen go into the dross and may be separated in a given case from the same by deposition in a receptacle in a metallic state or in the form of matte.

What I claim as my invention and desire to secure by Letters Patent is:

1. A method of obtaining oxid fumes from ores or furnace products, consisting in finely disintegrating said ore or furnace products, in mixing finely disintegrated carboniferous reducing means therewith, in making briquets of the mixture thus obtained, in feeding said briquets continuously into a furnace, in burning the carbon contained in said briquets in said furnace, in continuously supplying a powerful current of air to said burning briquets, whereby the volatile metals contained in said ore or furnace products are first reduced and then burned to oxids in the excess oxygen of the current of air, in continuously withdrawing said oxids with the furnace gases and in continuously removing the non-volatile residue of said briquets in a liquid state from the furnace.

2. A method of obtaining oxid fumes from ores or furnace products, consisting in finely disintegrating said ore or furnace products, in mixing finely disintegrated carbon therewith, in making briquets of the mixture thus obtained, in feeding said briquets continuously into a furnace, in burning the carbon contained in said briquets in said furnace, in continuously supplying a powerful current of air to said burning briquets, whereby the volatile metals contained in said ore or furnace products are first reduced and then burned to oxids in the excess oxygen of the current of air, in continuously withdrawing said oxids with the furnace gases and in continuously removing the non-volatile residue of said briquets in a liquid state from the furnace, the quantity of carbon which is added to said ore or furnace products being sufficiently great that in the combustion of the carbon the necessary amount of heat is obtained not only for the reduction and vaporization of the metal in said ore or furnace product, but also for melting the residue of the latter.

3. A method of obtaining oxid fumes from ores or furnace products, consisting in finely disintegrating said ore or furnace products, in mixing finely disintegrated carbon therewith, said disintegration of said ore or furnace products being sufficiently fine and the mixing with the carbon sufficiently intimate in order to effect with certainty a separation of the separate grains of ore one from another by means of intermediate grains of carbon, in making briquets of the mixture thus obtained, in feeding said briquets continuously into a furnace, in burning the carbon contained in said briquets in said furnace, in continuously supplying a powerful current of air to said burning briquets, whereby the volatile metals contained in said ore or furnace products are first reduced and then burned to oxids in the excess oxygen of the current of air, in continuously withdrawing said oxids with the furnace gases and in continuously removing the non-volatile residue of said briquets in a liquid state from the furnace.

4. A method of obtaining oxid fumes from ores or furnace products, consisting in finely disintegrating said ore or furnace product, in mixing finely disintegrated carboniferous reducing means therewith, in making briquets of the mixture thus obtained, in feeding said briquets continuously into a furnace, in adding carbon to said briquets in said furnace, in burning said carbon and the carbon contained in said briquets in said furnace, in continuously supplying a blast of air to said burning briquets, whereby the volatile metals contained in said ore or furnace product are first reduced and then burned to oxids in the excess oxygen of the current of air, in continuously withdrawing said oxids with the furnace gases and in continuously removing the non-volatile residue of said briquets in a liquid state from the furnace.

In testimony whereof I have signed my name to this specification in the presence of the two subscribing witnesses.

HERMANN PAPE.

Witnesses:
ERNEST H. L. MUMMENHOFF,
OTTO W. HELLMRICH.